US012803278B2

(12) United States Patent
Stahlfeld et al.

(10) Patent No.: US 12,803,278 B2
(45) Date of Patent: Nov. 17, 2026

(54) PREDICTING ELECTRICAL COMPONENT FAILURE

(71) Applicant: X Development LLC, Mountain View, CA (US)

(72) Inventors: Phillip Ellsworth Stahlfeld, Mountain View, CA (US); Leo Francis Casey, San Francisco, CA (US); Xinyue Li, San Mateo, CA (US); Gaurav Desai, San Jose, CA (US); Ananya Gupta, San Francisco, CA (US); Aviva Cheryl Shwaid, Santa Monica, CA (US); Laura Elizabeth Fedoruk, Burlingame, CA (US)

(73) Assignee: X Development LLC, Mountain View, CA (US)

( * ) Notice: Subject to any disclaimer, the term of this patent is extended or adjusted under 35 U.S.C. 154(b) by 412 days.

(21) Appl. No.: 18/331,765

(22) Filed: Jun. 8, 2023

(65) Prior Publication Data

US 2023/0411960 A1 Dec. 21, 2023

Related U.S. Application Data

(60) Provisional application No. 63/350,174, filed on Jun. 8, 2022.

(51) Int. Cl.
*H02J 3/00* (2026.01)
*G01N 29/14* (2006.01)
(Continued)

(52) U.S. Cl.
CPC .............. *H02J 3/001* (2020.01); *G01N 29/14* (2013.01); *G06T 7/0004* (2013.01); *G06T 2207/10048* (2013.01); *G06T 2207/20081* (2013.01)

(58) Field of Classification Search
None
See application file for complete search history.

(56) References Cited

U.S. PATENT DOCUMENTS 7,945,524 B2 5/2011 Anderson et al.
8,275,642 B2 9/2012 Chan et al.
(Continued)

FOREIGN PATENT DOCUMENTS

CN 109816033 5/2019
CN 112562698 B 11/2022
(Continued)

OTHER PUBLICATIONS

International Search Report and Written Opinion in International Appln. No. PCT/US2023/024847, dated Sep. 15, 2023, 14 pages.
(Continued)

*Primary Examiner* — Paul B Yanchus, III
(74) *Attorney, Agent, or Firm* — Fish & Richardson P.C.

(57) ABSTRACT

Methods, systems, and apparatus, including medium-encoded computer program products, for predicting electrical component failure. A first sensor measurement of a component of an electrical grid taken at a first time can be obtained. A second sensor measurement of the component taken at a second time can be identified, and the second time can be after the first time. An input, which can include the first sensor measurement and the second sensor measurement, can be processed using a machine learning model that is configured to generate, based on one or more changes in one or more characteristics of the component as depicted in the second sensor measurement compared to the first sensor measurement, a prediction representative of a likelihood that the component will experience a type of failure during a time interval. Data indicating the prediction can be provided for presentation by a display.

14 Claims, 7 Drawing Sheets

(51) Int. Cl.
*G06T 7/00* (2017.01)
*H02J 3/001* (2026.01)

(56) References Cited

U.S. PATENT DOCUMENTS

| | | | |
|---|---|---|---|
| 8,725,625 | B2 | 5/2014 | Anderson et al. |
| 8,751,421 | B2 | 6/2014 | Anderson et al. |
| 9,785,129 | B2 | 10/2017 | Bhageria et al. |
| 9,846,752 | B2 | 12/2017 | Nasle |
| 9,886,082 | B2 | 2/2018 | Grimes et al. |
| 10,215,814 | B2 | 2/2019 | Basu et al. |
| 10,229,376 | B2 | 3/2019 | Anderson et al. |
| 10,389,600 | B2 | 8/2019 | Aggarwal et al. |
| 10,482,000 | B2 | 11/2019 | Vikjord et al. |
| 10,996,735 | B2 | 5/2021 | Scalf et al. |
| 11,101,652 | B2 | 8/2021 | Kelly et al. |
| 11,144,858 | B2 | 10/2021 | Fife |
| 2005/0114088 | A1 | 5/2005 | Gorden et al. |
| 2012/0191439 | A1 | 7/2012 | Meagher et al. |
| 2014/0156094 | A1 | 6/2014 | Trias |
| 2016/0359106 | A1 | 12/2016 | Masuoka et al. |
| 2020/0104730 | A1 | 4/2020 | Strong |
| 2020/0209841 | A1* | 7/2020 | Srinivasan ........... G05B 23/024 |
| 2021/0203157 | A1 | 7/2021 | Visweswariah et al. |
| 2021/0241126 | A1 | 8/2021 | Nasle et al. |
| 2021/0373063 | A1 | 12/2021 | Gundel et al. |
| 2022/0036199 | A1 | 2/2022 | Prasanna et al. |
| 2022/0058591 | A1 | 2/2022 | Xiong et al. |
| 2022/0414556 | A1* | 12/2022 | Seabloom ......... H02J 13/00001 |

FOREIGN PATENT DOCUMENTS

| | | | |
|---|---|---|---|
| CN | 112381784 | B | 6/2024 |
| CN | 112991297 | B | 6/2024 |
| CN | 113869444 | B | 11/2024 |
| JP | 2019102694 | A | 6/2019 |
| KR | 101761686 | B1 | 7/2017 |
| KR | 20200014129 | | 2/2020 |
| WO | WO 2009/042581 | | 4/2009 |

OTHER PUBLICATIONS

International Preliminary Report on Patentability in International Appln. No. PCT/US2023/024847, dated Dec. 10, 2024, 8 pages.
Office Action in Japanese Appln. No. 2024-569452, mailed on Jan. 9, 2026, 19 pages (with English translation).
Notice of Allowance in Japanese Appln. No. 2024-569452, mailed on Aug. 28, 2026, 4 pages (with English translation).
Office Action in European Appln. 23739709.6, mailed on Aug. 17, 2026, 9 pages.

* cited by examiner

PREDICTING ELECTRICAL COMPONENT FAILURE

CROSS-REFERENCE TO RELATED APPLICATION

This application claims priority to U.S. Provisional Application No. 63/350,174, filed on Jun. 8, 2022. The disclosure of the prior application is considered part of and is incorporated by reference in the disclosure of this application.

TECHNICAL FIELD

The present specification relates to electrical grids, and specifically to processes for predicting failures of components of an electrical grid.

BACKGROUND

Electrical utilities have hundreds of thousands of assets deployed in the field. When an asset fails (e.g., a transformer explodes), the failure can cause widespread outages and present life-threatening hazards. To prevent failures, simple heuristics can be used to determine when upgrades and replacements are recommended. For example, a utility may have a policy of replacing transformers after a fixed period of operation (e.g., 20 years). However, while simple heuristics can be used to make approximate predictions, they can over-predict and under-predict failure. With over-predicted failures, equipment is replaced prematurely resulting in wasted costs and materials; with under-predicted failures, equipment fails unexpectedly with potentially catastrophic consequences. For example, a time-based heuristic can be used to determine when to replace transformers, but the heuristic may over-predict failures of lightly-loaded transformers in gentler environments, or under-predict failures of highly-loaded transformers in hot environments.

SUMMARY

In general, this specification relates to processes for predicting failures of components of an electrical grid, and more specifically, this disclosure relates to using two or more time-series sensor measurements as an input to a machine learning model configured to predict component failure.

One aspect features obtaining a first sensor measurement of a component of an electrical grid taken at a first time. A second sensor measurement of the component taken at a second time can be identified, and the second time can be after the first time. An input, which can include the first sensor measurement and the second sensor measurement, can be processed using a machine learning model that is configured to generate, based on one or more changes in one or more characteristics of the component as depicted in the second sensor measurement compared to the first sensor measurement, a prediction representative of a likelihood that the component will experience a type of failure during a time interval. The time interval can be a period of time after the second time. Data indicating the prediction can be provided for presentation by a display.

In some implementations, the sensor measurement can be an image, such as an optical image or a thermal image. In some implementations, the sensor measurement can be an acoustic recording.

One or more of the following features can be included. The machine learning model can include a defect-detection machine learning model and a failure-prediction machine learning model. The machine learning model can include a failure-prediction machine learning model. The failure-prediction machine learning model can include defect-detection hidden layers. The prediction can include one or more of the likelihood that the component will fail over a single period of time, the likelihood that the component will fail over each of multiple periods of time, a mean time to failure, a distribution of failure probabilities, or the most likely period over which the component will fail. The characteristics of the component can include one or more of bulges, tilting, loose fasteners, missing fasteners, cracks, burn marks, rust, leaking oil, missing insulation or damaged insulation, operating sounds, or thermal qualities. The machine learning model can be a recurrent neural network. The recurrent neural network can be a long short-term memory machine learning model or a cross-attention based transformer model. The input can further include features of the component and features of the operating environment. The features of the operating environment can include a series of temperature values measured at or around the location of the component. An input that can include the first sensor measurement and features of the operating environment can be processed using a machine learning model that is configured to generate a prediction that represents a recommended time for capturing one or more subsequent sensor measurements of the component.

In some implementations, the first and second sensor measurements are images of the component. A first acoustic recording of the component of the electrical grid taken at the first time can be obtained. A second acoustic recording of the component taken at the second time can be identified. A second input, which can include the first acoustic recording and the second recording, can be processed using a second machine learning model that is configured to generate, based on one or more changes in one or more characteristics of the component as depicted in the second acoustic recording compared to the first acoustic recording, a second prediction representative of a likelihood that the component will experience a type of failure during the time interval. The data that is provided for presentation by a display can be determined based on a weighted combination of the prediction and the second prediction.

In some implementations, the first and second sensor measurements are optical images of the component. A first thermal image of the component of the electrical grid taken at the first time can be obtained. A second thermal image of the component taken at the second time can be identified. A second input comprising the first thermal image and the second thermal image can be processed using a second machine learning model that is configured to generate, based on one or more changes in one or more characteristics of the component as depicted in the second thermal image compared to the first thermal image, a second prediction representative of a likelihood that the component will experience a type of failure during the time interval. The data that is provided for presentation by a display can be determined based on a weighted combination of the prediction and the second prediction.

Particular embodiments of the subject matter described in this specification can be implemented so as to realize one or more of the following advantages. The techniques described below can be used to predict component failure using a series of sensor measurements, such as images, of the component taken over a period of time. By using multiple images of the component, the system can determine changes to defects of the component, including the rate of change, to produce more accurate reliability predictions. The system can also produce more accurate reliability predictions by using predictions based on different types of sensor measurements, such as images and audio recordings, or different types of images. The system can also produce more accurate reliability predictions by using features of the operating environment of the component.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1:
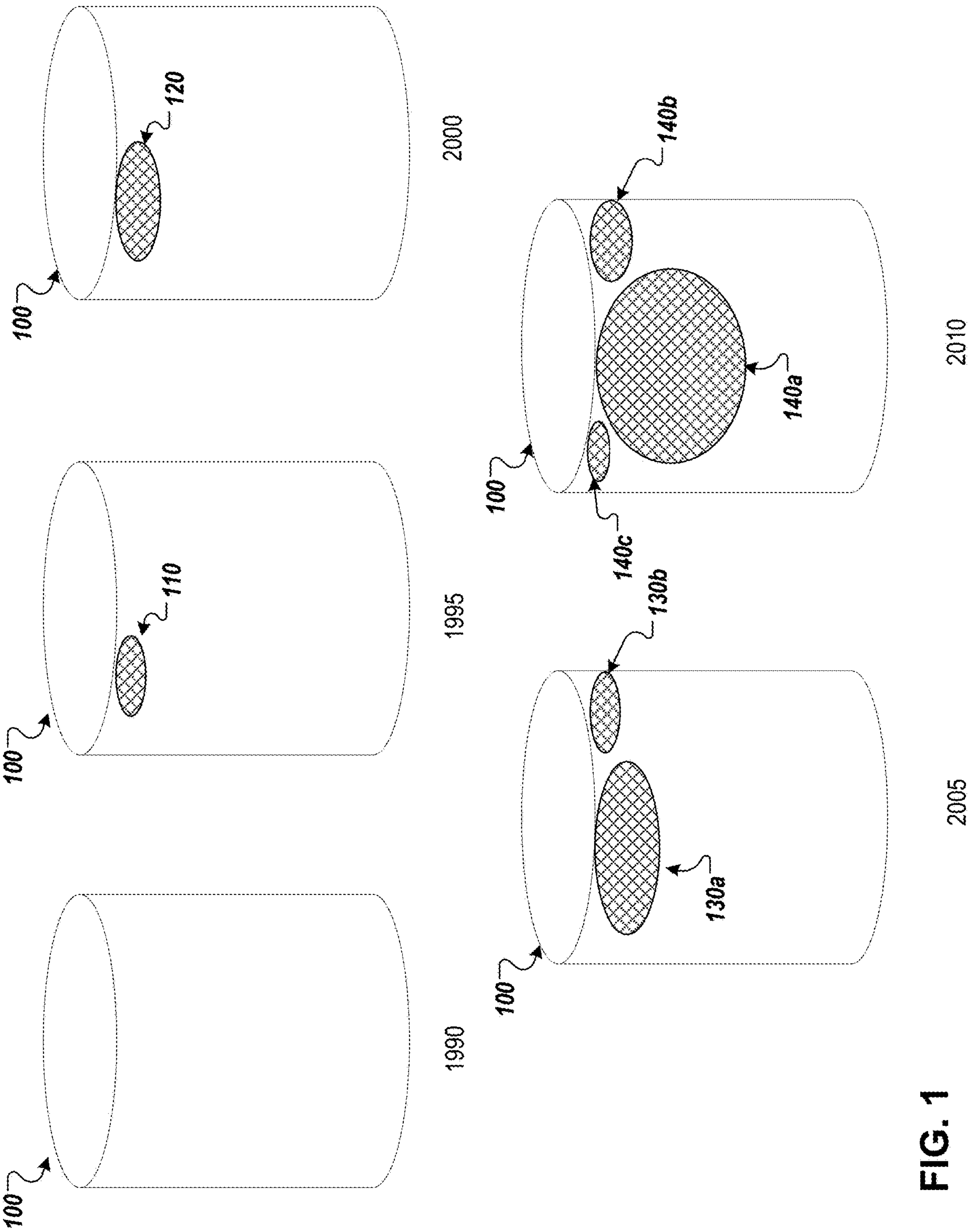
FIGS. 1 and 2 are illustrations of component defects over a period of time.
Figure 2:
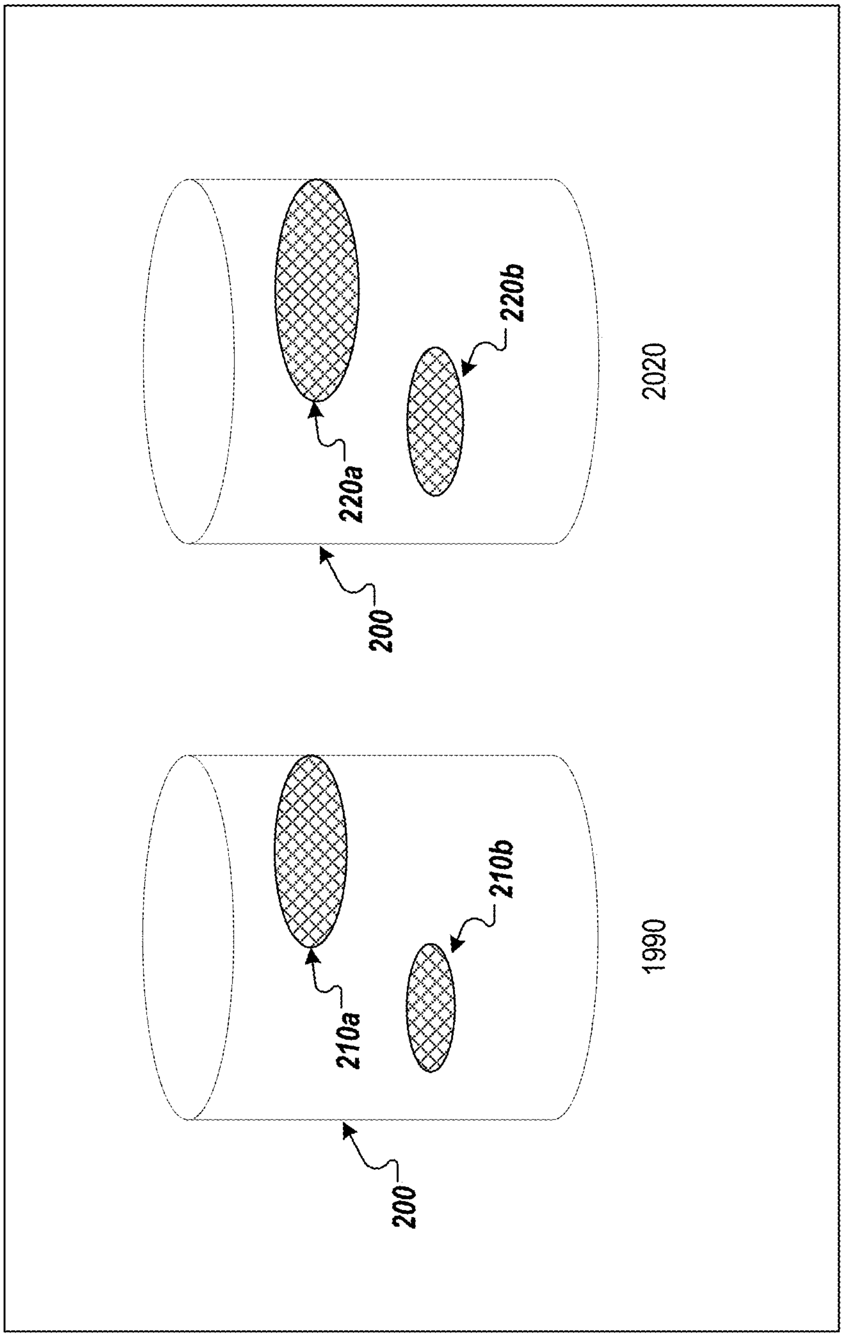

This specification describes techniques for predicting the likelihood of failure for a component of an electrical grid over one or more specified time periods. The techniques can include evaluating sensor measurements of a component taken at multiple times. For example, the sensor measurements can include image data. For example, FIGS. 1 and 2 are illustrations of component defects over a period of time that are visible in images. FIG. 1 depicts a transformer 100 at five time periods, 1990, 1995, 2000, 2005 and 2010, and the amount of rust 110, 120, 130*a*, 130*b*, 140*a*, 140*b*, 140*c* increases with time. For example, in 1990, the transformer 100 shows no rust. In 1995, the transformer 100 has one small rust spot 110. In 2000, the transformer 100 shows a larger rust spot 120. By 2005, the transformer 100 includes a large rust spot 130*a* and a second, smaller rust spot, 130*b*. In 2010, the transformer 100, includes a very large rust spot 140*a* and two smaller rust spots 140*b*, 140*c*.

Both the presence of a defect (rust, in this example) and the rate of change of the defect can be used to predict component failure. In FIG. 1, the amount of rust increases over time, which can be predictive of a failure, e.g., if the component can no longer function properly, or is less-likely to function properly, if the rust coverage exceeds a threshold value.

In contrast, FIG. 2 shows a transformer 200 with rust 210*a*, 210*b*, 220*a*, 220*b* at two time periods, 1990 and 2020. While the amount of rust is significant, it changed little over a 30-year period. If the unit has not failed due to rust over this 30-year period, the slow rate of spread can indicate a low probability that rust will cause a failure over a period of the next several years. And while FIGS. 1 and 2 illustrate rust as one example, a wide variety of defects can be considered. Examples of defects visible in images can include bulges, tilting, loose or missing fasteners, cracks, burn marks, rust, leaking oil (e.g., oil stains), missing or damaged insulation, or thermal qualities, among many others.

For those reasons, a system that considers only a single image, and thus fails to evaluate not only the presence of a defect, but also the rate of change of defects, can miss a predictive signal of failure or non-failure. Therefore, this specification describes techniques that determine predictions by using a machine learning model that evaluates signals from multiple time periods.

In addition, a system that considers other types of sensor measurements can evaluate more predictive signals. For example, the system can consider image data such as thermal images, or audio recording data.

Figure 3A:
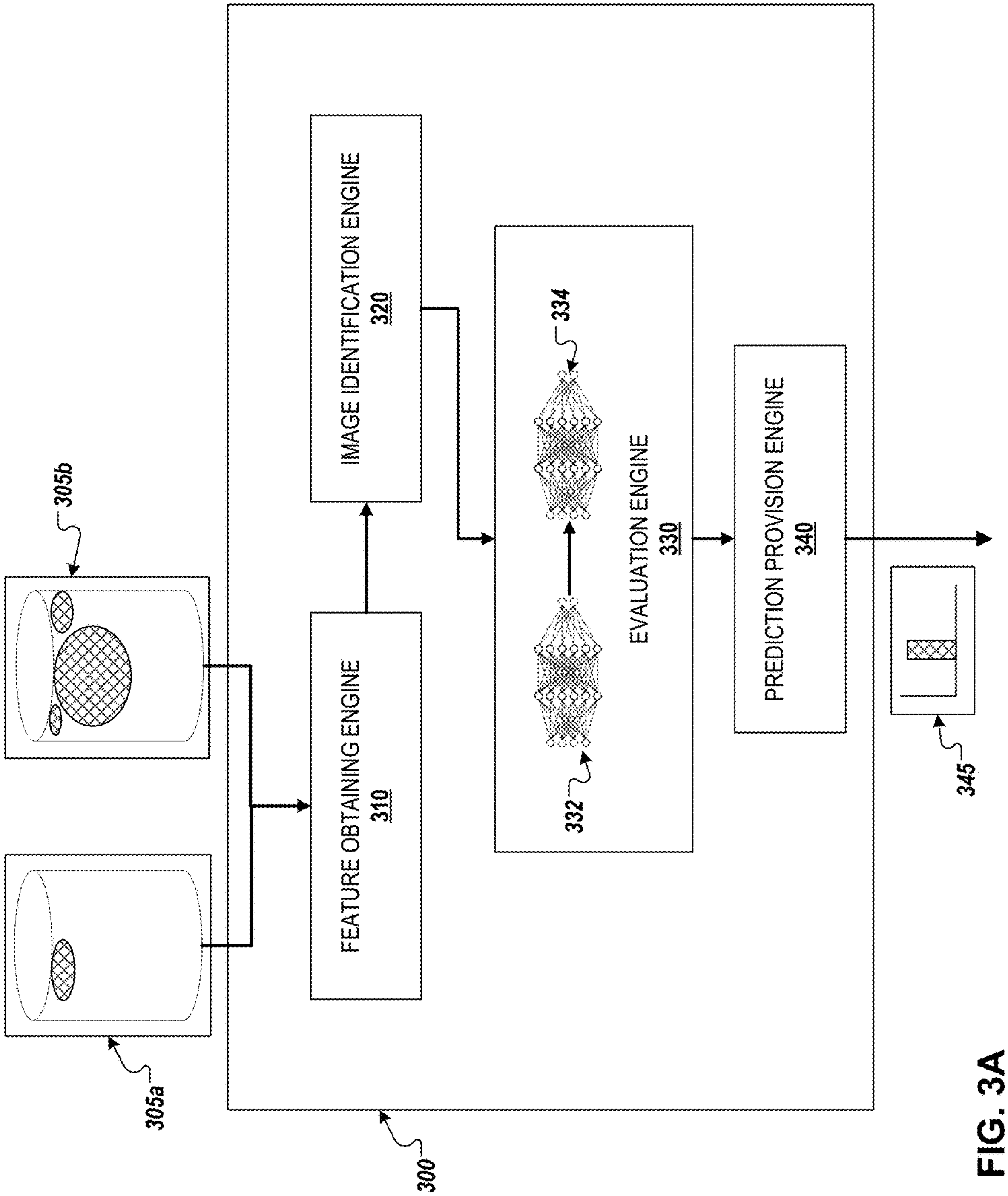
FIGS. 3A-3B are diagrams of example systems for predicting electrical component failure.

FIG. 3A is a diagram of an example of a system 300 for predicting electrical component failure. In brief, the system 300 can process an input that includes sensor measurement data using a defect-detection machine learning model to determine which, if any, defects exist on the component. For example, the defect-detection machine learning model can be a classification machine learning model such as a convolutional neural network or any other suitable type of classification model. The system 300 can provide a sensor measurement to the defect-detection machine learning model, and the defect-detection machine learning model can determine an output that includes an encoding of the sensor measurement. The encoding can include an indication of the presence and type of defect. The system 300 can process sensor measurements of the component taken at different time using the defect-detection machine learning model, and use the multiple outputs as input to the failure-prediction machine learning model, as described below.

A sensor measurement of a component can be obtained by a sensor for a particular point in time. For example, the sensor measurement can be an image taken of the component, or an audio recording taken near the component. The audio recording may capture, for example, sounds made by the component.

In the example of FIG. 3A, the sensor measurement is an image. The image can be an optical image. In some implementations, the image can be another type of image such as a thermal image.

Thus, the system 300 can process an input that includes an image using a defect-detection machine learning model to determine which, if any, defects exist on the component. The system 300 can provide an image to the defect-detection machine learning model, and the defect-detection machine learning model can determine an output that includes an encoding of the image. The encoding can include an indication of the presence and type of defect. The system 300 can process images of the component taken at different time using the defect-detection machine learning model, and use the multiple outputs as input to the failure-prediction machine learning model, as described below.

Examples of defects can include bulges, tilting, loose or missing fasteners, cracks, burn marks, rust, leaking oil (e.g., oil stains), missing or damaged insulation, operating sounds, or thermal qualities, among many others.

The image data can be obtained from various sources. For example, the owner of the component can capture images at periodic intervals. Images can be obtained from other parties, e.g., vehicles that include cameras such as self-driving cars, photo sharing web sites (provided the photo owner approves such use), and so on.

To determine the likelihood of failure, the system can process an input that includes the output of the defect-detection machine learning model for two images of a component using a failure-prediction machine learning model that is configured to produce a prediction related to the failure of a component over some period of time.

The input can further include a grid map, features of the component and features of the operating environment. Features of the operating environment can include, but are not limited to, the number and timing of blackout, brownouts, lightning strikes and blown fuses, and weather conditions (e.g., temperature and humidity). In addition, features of the operating environment can include one or more series of values. For example, such series can include temperature values measured at or around the location of a component at multiple points in time.

In implementations where the sensor measurements include thermal images, the system can use features of the operating environment to distinguish changes in the component and changes in the environment. For example, thermal images may be taken at different times of year or in different environmental conditions. The different environmental conditions may affect the temperatures present in the thermal images. Thus the system can use features such as temperature of the environment to compare thermal qualities of the component at different points in time, isolated from changes in the environment.

In implementations where the sensor measurements include thermal images, for example, the system can use features of the operating environment to determine thermal qualities of the component. For example, the system can use temperature values measured at or around the location of the component, taken at a point in time within the same window of time that a thermal image of the component was taken, to determine an ambient temperature of the environment of the component. The system can thus obtain temperature information by comparing the temperatures present in the thermal image to the ambient temperature. As another example, the system can use weather conditions such as humidity to perform a moisture analysis. For example, moist air, or air with higher humidity, has a higher heat capacity and is a better heat conductor than dry air. The moisture conditions of the air around a component can affect the temperature of the component. The system can thus determine thermal qualities of the component in the context of the environment using thermal images and humidity information.

Features of the component can include, but are not limited to, the make, model, duration of use, ratings, thermal constant, winding type, and load metrics (maximum load, average load, time under maximum load, etc.). The grid map can include, for example, components present in the grid, their interconnection patterns, and distance between elements.

The defect-detection machine learning model can be a neural network. In some implementations, defect-detection machine learning model is a long short-term memory (LSTM) model. LSTM models differ from feed forward models in that they can process sequences of data, such as the sensor measurements (or output from processing the sensor measurements) of the component over multiple time periods. In some implementations, the defect-detection machine learning model is a cross-attention based transformer model.

Examples of predictions of the failure-prediction machine learning model can include, but are not limited to, the likelihood that the component will fail over a single period of time, the likelihood that the component will fail over each of multiple periods of time, the mean time to failure, and the most likely period over which the component will fail. In addition, the failure-prediction machine learning model can be configured to produce one or more of these outputs.

The failure-prediction machine learning model can be evaluated in response to various triggers. For example, the model can be evaluated whenever new data (e.g., an image of a component) arrives, at periodic intervals and when a user requests evaluation (e.g., during a maintenance planning exercise).

In some implementations, the defect-detection machine learning model is a component of the failure-prediction machine learning model (described above). For example, defect-detection can be performed by one or more hidden layers within a failure-prediction machine learning model, and the output from those layers can be used by the other layers of the failure-prediction machine learning model.

The system 300 can train the failure-prediction machine learning model using training examples that include feature values and outcomes. The outcome can indicate whether the component failed during a given time period. For example, the value “1” can indicate failure and the value “0” can indicate no failure. Feature values can include two or more images of a component, a grid map, features of the component, and features of the operating environment, as described above.

The system 300 can include a feature obtaining engine 310, an image identification engine 320, an evaluation engine 330 and a prediction provision engine 340. The engines 310, 320, 330, and 340 can be provided as one or more computer executable software modules, hardware modules, or a combination thereof. For example, one or more of the engines 310, 320, 330, and 340 can be implemented as blocks of software code with instructions that cause one or more processors of the system 300 to execute operations described herein. In addition or alternatively, one or more of the engines 310, 320, 330, and 340 can be implemented in electronic circuitry such as, e.g., programmable logic circuits, field programmable logic arrays (FPGA), or application specific integrated circuits (ASIC).

The feature obtaining engine 310 can obtain feature data relevant to component failure. Feature data can include, but is not limited to, images 305*a*, 305*b* of electrical components and of elements that relate to potential failure of electrical components, such as structural supporting elements. Examples of components can include, but are not limited to, transformers, fuses, wires, and related structures such as utility poles, cross-arms, insulators, and lightning arrestors.

Visual indicators relevant to component failure that can be present in an image 305*a*, 305*b* can include defects such as rust (as illustrated in FIGS. 1 and 2), cracks, holes, deformities, etc., to the component itself, to any support structures (e.g., utility poles which might begin to lean over time), or a combination thereof. Indicators relevant to component failure that can be present in a thermal image can include a higher than normal operating temperature, or hot spots on a component, for example. Images can be encoded in any suitable format including, but not limited to, joint photographic expert group (JPEG), Tag Image File Format (TIFF), or a lossless format such as RAW.

In some implementations, the feature obtaining engine 310 can obtain additional feature data. For example, additional feature data can include a grid map, features of the component, and features of the operating environment. Features of the operating environment can include, but are not limited to, the number and timing of blackouts, brownouts, lightning strikes and blown fuses, and weather and environmental conditions (e.g., temperature, humidity, vegetation level). Features of the component can include, but are not limited to, the make, model, duration of use, ratings, thermal constant, winding type, service history, and load metrics (maximum load, average load, time under maximum load, etc.). The grid map can include, for example, components present in the grid, their interconnection patterns, and distance between elements.

Feature data can further include metadata describing the feature data such as a timestamp for the feature data (e.g., the date and time an image was captured), a timestamp for when the feature data was obtained, a location (e.g., the location of the image capture device and/or of the objects captures in an image as provided by GPS or other means), the provider of the feature data, an asset identifier (e.g., provided by a person capturing an image of an asset), etc.

The feature obtaining engine 310 can obtain feature data using various techniques. In some implementations, the feature obtaining engine 310 retrieves feature data from data repositories such as databases and file systems. The feature obtaining engine 310 can gather feature data at regular intervals (e.g., daily, weekly, monthly, and so on) or upon receiving an indication that the data changed. In some implementations, the feature obtaining engine 310 can include an application programming interface (API) through which feature data can be provided to the feature obtaining engine 310. For example, an API can be a Web Services API.

The image identification engine 320 can accept an image of an electrical component and determine whether one or more other images depict the same electrical component. The image identification engine 320 can include an object recognition machine learning model, such as a convolutional neural network (CNN) or Barlow Twins model, that is configured to identify objects in images.

In some implementations, the image identification engine 320 can evaluate metadata associated with features of an electrical component. For example, if metadata include locations for assets, and the image identification engine 320 determines that the location of two assets differ, the image identification engine 320 can determine that the images depict different electrical components. Similarly, if metadata include asset identifiers for assets, and the image identification engine 320 determines that the asset identifiers of two assets differ, the image identification engine 320 can determine that the images depict different electrical components.

The evaluation engine 330 can accept feature data (described above) and evaluate one or more machine learning models to produce predictions relating to electrical component failure. Examples of predictions of the failure-prediction machine learning model can include, but are not limited to, the likelihood that the component will fail over a single period of time, the likelihood that the component will fail over each of multiple periods of time, the mean time to failure, a distribution of failure probabilities, and the most likely period over which the component will fail.

The evaluation engine 330 can include one or more machine learning models. In some implementations, evaluation engine 330 includes a failure-prediction neural network 334 configured to accept input and to produce predictions, e.g., the types of predictions listed above. In some implementations, the evaluation engine 330 includes one failure-prediction neural network 334 that produces one or more prediction types. In some implementations, the evaluation engine 330 includes multiple failure-prediction neural networks 334 that each produce one or more prediction types.

As described above, the input can include images of an asset at multiple time periods. In addition, input features can further include, without limitation, a grid map, features of the component and features of the operating environment. Features of the operating environment can include, but are not limited to, the number and timing of blackout, brownouts, lightning strikes and blown fuses, and weather conditions (e.g., temperature and humidity). Features of the component can include, but are not limited to, the make, model, duration of use, ratings, thermal constant, winding type, and load metrics (maximum load, average load, time under maximum load, etc.). The grid map can include, for example, components present in the grid, their interconnection patterns, and distance between elements.

In some implementations, the evaluation engine 330 includes a defect-detection machine learning model 332 and one or more failure-prediction machine learning models 334. To determine which, if any, defects exist on the component, the system can process an input that includes one or more images of a component using a defect-detection machine learning model 332. The defect-detection machine learning model 332 can be a neural network, and in some implementations, the defect-detection machine learning model 332 is a recurrent neural network (e.g., a long short-term memory (LSTM) model) or another type of sequential machine learning model. Recurrent models differ from feed forward models in that they can process sequences of data, such as the images (or output from processing the images) of the component over multiple time periods.

The system can provide the input (which includes an image) to the defect-detection machine learning 332, and the defect-detection machine learning model 332 can produce an output that includes an encoding of the image. The encoding can include an indication of the presence and type of defect. The system can process images of the component taken at different times using the defect-detection machine learning model 332, and use the one or more outputs as input to the failure-prediction machine learning model 334. The system can then process an input that includes the output(s) of the defect-detection machine learning model, and other feature data (described above) using a machine learning model configured to produce a prediction that describes the likelihood of failure.

In some implementations, a defect-detection machine learning model is a component of the failure-prediction machine learning model 334. For example, defect-detection can be performed by one or more hidden layers within a failure-prediction machine learning model 334, and the output from those layers can be used by the other layers of the failure-prediction machine learning model.

The prediction provision engine 340 can provide one or more predictions produced by the evaluation engine 330. In some implementations, the prediction provision engine 340 can produce user interface presentation data 345 that, when rendered by a client device, causes the client device to display the prediction. In some implementations, the prediction provision engine 340 can transmit one or more predictions to network connected devices, including storage devices and databases.

Figure 3B:
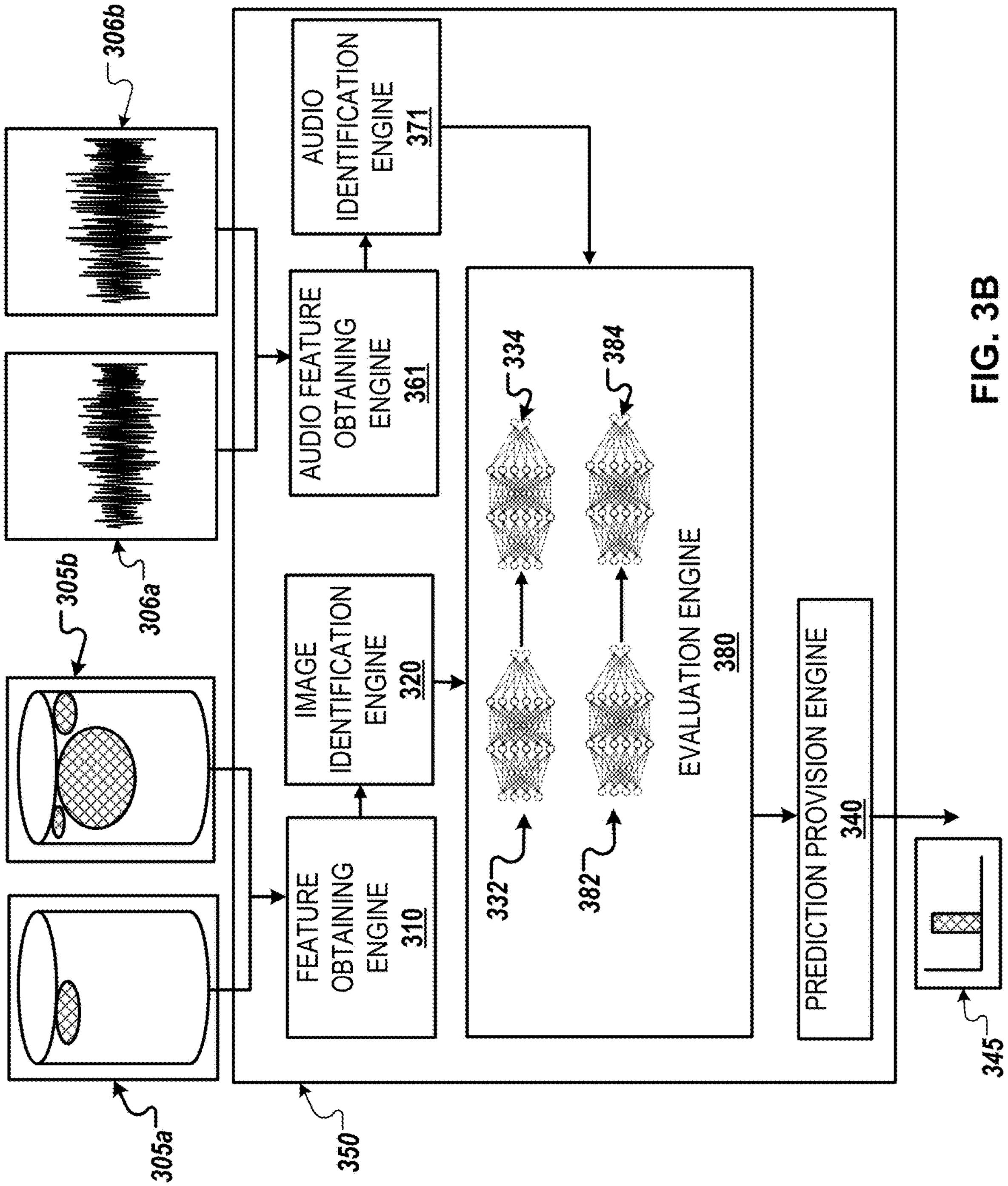

FIG. 3B is a diagram of an example of a system 350 for predicting electrical component failure. The system 350 is similar to the system 300 of FIG. 3A, but can process an input that includes sensor measurement data of different types.

The system 350 can include the feature obtaining engine 310, the image identification engine 320, an audio feature obtaining engine 371, an audio identification engine 371, an evaluation engine 380 and a prediction provision engine 340. The engines 361, 371, and 380 can be provided as one or more computer executable software modules, hardware modules, or a combination thereof. For example, one or more of the engines 361, 371, and 380 can be implemented as blocks of software code with instructions that cause one or more processors of the system 350 to execute operations described herein. In addition or alternatively, one or more of the engines 361, 371, and 380 can be implemented in electronic circuitry such as, e.g., programmable logic circuits, field programmable logic arrays (FPGA), or application specific integrated circuits (ASIC).

The audio feature obtaining engine 361 is similar to the feature obtaining engine 310 and can obtain audio feature data relevant to component failure. Audio feature data can include, but is not limited to, audio recordings 306*a*, 306*b* of electrical components and of elements that relate to potential failure of electrical components, such as structural supporting elements.

Audio indicators relevant to component failure that can be present in an audio recording 306*a* or 306*b* and can include defects such as abnormal operating sounds, such as humming, of the component itself, or to any support structures (e.g., clanging sounds from loose connections), or a combination thereof. Audio recordings can be encoded in any suitable format including, but not limited to, spectrograms or other audio formats.

For example, audio recording 306*b* may include audio features that indicate that the component's operating sounds are louder or abnormal compared to normal operation or to the audio features of audio recording 306*a*.

In some implementations, the audio feature obtaining engine 361 can obtain additional feature data as described with reference to the feature obtaining engine 310. Feature data can include metadata describing the feature data such as a timestamp for the feature data (e.g., the date and time an audio recording was captured), a timestamp for when the feature data was obtained, a location (e.g., the location of the audio recording capture device and/or of the objects captured in an audio recording as provided by GPS or other means), the provider of the feature data, an asset identifier (e.g., provided by a person capturing an audio recording of an asset), etc.

The audio feature obtaining engine 361 can obtain feature data using various techniques as described with reference to the feature obtaining engine 310.

The audio identification engine 371 is similar to the image identification engine 320, and can accept an audio recording of an electrical component and determine whether one or more other audio recordings depict the same electrical component. The audio identification engine 371 can include a machine learning model that is configured to identify the sounds made by electrical components in audio recordings.

In some implementations, the audio identification engine 371 can evaluate metadata associated with features of an electrical component. For example, if metadata include locations for where the audio recording was captured, the audio identification engine 371 can determine that the location of the audio recordings differs over a threshold distance, and the image identification engine 371 can determine that the audio recordings capture different electrical components. Similarly, if metadata include asset identifiers for assets, and the audio identification engine 371 determines that the asset identifiers of two assets differ, the audio identification engine 371 can determine that the images depict different electrical components.

The evaluation engine 380 is similar to the evaluation engine 330 but can include additional machine learning models. For example, the evaluation engine 380 can include a failure-prediction neural network configured to accept input and to produce predictions. In some implementations, the evaluation engine 380 can include a separate failure-prediction neural network, such as failure-prediction neural network 334 and failure-prediction neural network 384, configured to produce predictions for different types of inputs.

As described above, the input to a failure-prediction neural network 334 can include images of an asset at multiple time periods. The input to a separate failure-prediction neural network 384 can include audio recordings of an asset at multiple time periods. In addition, input features can further include, without limitation, a grid map, features of the component and features of the operating environment. Features of the operating environment can include, but are not limited to, the number and timing of blackout, brownouts, lightning strikes and blown fuses, and weather conditions (e.g., temperature and humidity). Features of the component can include, but are not limited to, the make, model, duration of use, ratings, thermal constant, winding type, and load metrics (maximum load, average load, time under maximum load, etc.). The grid map can include, for example, components present in the grid, their interconnection patterns, and distance between elements.

In some implementations, the evaluation engine 380 includes one or more defect-detection machine learning models such as defect-detection machine learning model 332 and defect-detection machine learning model 382, and one or more failure-prediction machine learning models such as 334 and 384. To determine which, if any, defects exist on the component, the system can process an input that includes one or more images of a component using a defect-detection machine learning model 332. To determine which, if any, defects exist on the component, the system can process an input that includes one or more audio recordings of a component using a defect-detection machine learning model 382. The defect-detection machine learning model 382 can be a neural network, and in some implementations, the defect-detection machine learning model 382 is a recurrent neural network (e.g., a long short-term memory (LSTM) model) or another type of sequential machine learning model.

The system can provide the input (which includes an image or an audio recording) to the corresponding defect-detection machine learning model 332 or defect-detection machine learning model 382. The defect-detection machine learning model 332 can produce an output that includes an encoding of the image. The defect-detection machine learning model 382 can produce an output that includes an encoding of the audio recording. The encodings can include an indication of the presence and type of defect. The system can process images of the component taken at different times using the defect-detection machine learning model 332, and use the one or more outputs as input to the failure-prediction machine learning model 334. The system can process audio recordings of the component taken at different times using the defect-detection machine learning model 382, and use the one or more outputs as input to the failure-prediction machine learning model 384. The system can then process an input that includes the output of the defect-detection machine learning model 332 and other feature data (described above) using a machine learning model configured to produce a first prediction that describes the likelihood of failure. The system can then process an input that includes the output of the defect-detection machine learning model 382 and other feature data (described above) using a machine learning model configured to produce a second production that describes the likelihood of failure. The system can determine a final prediction based on a weighted combination of the first prediction and the second prediction.

In some implementations, as described above, a defect-detection machine learning model is a component of the failure-prediction machine learning model 334 or failure-prediction machine learning model 384.

Figure 4:
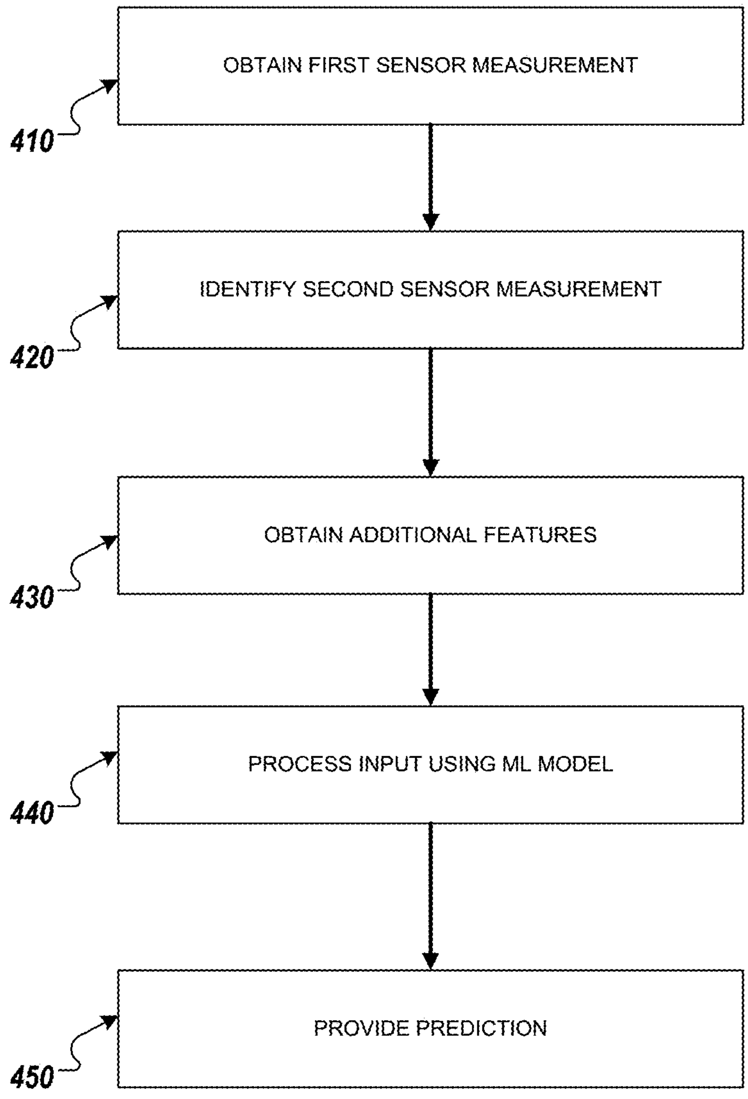
FIG. 4 a flow diagram of an example process for predicting electrical component failure.

FIG. 4 is a flow diagram of an example process for predicting electrical component failure. For convenience, the process 300 will be described as being performed by a system for predicting electrical component failure, e.g., the system predicting electrical component 300 failure of FIG. 3, appropriately programmed to perform the process. Operations of the process 400 can also be implemented as instructions stored on one or more computer readable media which may be non-transitory, and execution of the instructions by one or more data processing apparatus can cause the one or more data processing apparatus to perform the operations of the process 400. One or more other components described herein can perform the operations of the process 400.

The system obtains (410) a first sensor measurement of a component of an electrical grid taken at a particular time. Sensor measurements can include, for example, images or audio recordings. Sensor measurements, including the first sensor measurement, can be obtained from various sources. For example, the owner of the component can capture images at periodic intervals. In another example, images can be obtained from other parties, e.g., vehicles that include cameras such as self-driving cars, drones, photo-sharing web sites (provided the photo owner approves such use), and so on.

The system identifies (420) a second sensor measurement of the component taken at a later time. The system can process the first sensor measurement and each sensor measurement in a set of second sensor measurements using a machine learning model configured to determine whether the electrical component in the first sensor measurement is also present in the second sensor measurement. For example, if the sensor measurement is an image, the system can use an object detection machine learning model configured to determine whether the electrical component depicted in the first image is also present in the second image. For each of one or more second images (drawn from the set), the system can use the machine learning model to determine a predicted likelihood that the component is present in the second image. If the system determines that the predicted likelihood satisfies a threshold value, the system determines that the second image contains the component. In some implementations, the system can process the machine learning model using the first image and all second images in the set.

In some implementations, the system can use metadata from the first sensor measurement and each sensor measurement in the set of second sensor measurements to determine whether the electrical component in the first sensor measurement is also present in the second sensor measurement. For example, the system can use metadata from the first image and each image in the set of second images to determine whether the electrical component depicted in the first image is also present in the second image. For example, location data (e.g., GPS readings) for the first image can be compared to location data for each image in the second set of images. If the location of the images is the same, or within a threshold distance, the system can determine that the component is depicted in both images. The threshold distance can be predefined or calculated based on the geographic distribution of similar assets within a geographic region. For example, a larger threshold distance may be used for more rural regions with fewer transformers per unit of area, while a smaller one may be used for urban regions with more transformers per unit of area.

The machine learning model can obtain the set of second sensor measurements using the techniques of operation 410 or similar techniques. In addition, in some implementations, once a sensor measurement obtained in operation 410 has been evaluated using the process 400, the sensor measurement can be retained for future use in operation 420.

In some implementations, the system is provided with a first sensor measurement and a second sensor measurement of a component, and therefore the second sensor measurement is identified when the sensor measurements are provided. For example, a user can call an API provided by the system to provide the first and second sensor measurements.

The system optionally obtains (430) additional feature data relevant to electrical component failure. The additional feature data can include a grid map, features of the component and features of the operating environment, as described above.

The system can obtain the additional feature data using various means. The system can retrieve data from information sources using an API provided by the data source. The system can retrieve data from various databases using Structure Query Language (SQL) operations. The system can retrieve data from file systems using conventional file system operations. The system can provide an API and users of the system (which can be computing devices) can invoke the API to provide data.

The system processes (440) an input that includes at least the first sensor measurement and the second sensor measurement using one or more machine learning models that are configured to generate, based on one or more changes in one or more characteristics of the component as depicted in the second sensor measurement compared to the first sensor measurement, a prediction representative of a likelihood that the component will experience a type of failure during a time interval, wherein the time interval is a period of time after the second time.

To determine which, if any, defects exist on the component, the system can process an input that includes a sensor measurement using a defect-detection machine learning model. The system can provide two or more sensor measurements of a component to the defect-detection machine learning model, and the defect-detection machine learning model can determine an output that includes an encoding of the sensor measurements. The encoding can include an indication of the presence and type of defect. The system can process sensor measurements of the component taken at different times using the defect-detection machine learning model, and use the multiple outputs as input to the failure-prediction machine learning model.

To determine the likelihood of failure, the system can process an input that includes the output of the failure-prediction machine learning model for two or more images of a component using a failure-prediction machine learning model that is configured to produce a prediction related to the failure of a component over some period of time. The input can further include additional feature data, as described above.

The failure-prediction machine learning model can be evaluated in response to various triggers. For example, the model can be evaluated whenever new data (e.g., an image of a component) arrives, at periodic intervals and when a user requests evaluation (e.g., during a maintenance planning exercise).

In some implementations, the system can process an input that includes the first sensor measurement and other feature data (e.g., features of the component and features of the operating environment) without a second sensor measurement. In such implementations, the system can employ one or more machine learning models that are configured to generate a prediction representative of a likelihood that the component will experience a type of failure during a time interval. Such machine learning models can be trained using backpropagation on examples in which each example includes a sensor measurement of a component, other feature data and an outcome. The other feature data can include features of a component and features of the operating environment. Outcomes can represent failure if the component failed within the time interval and success if the component did not fail during that interval. Notes that features of the component can allow the machine learning model(s) to learn which components fail under similar circumstances. For example, components that are the same make and model are likely to fail in similar circumstances, and such failures will be present in the training data, allowing the machine learning model to learn the failure patterns. In addition, components of the same type (e.g., transformers) can follow similar failure patterns, even if the patterns differ somewhat due to differences in makes and models. Such an approach can provide an initial failure prediction before a second image is available. Note that the "new" asset may be an asset that has been installed in the electric grid for some time, but is newly entered into the system for predicting electrical component failure.

In some implementations, the system can process an input that includes the first sensor measurement and other feature data (e.g., features of the component and features of the operating environment) using one or more machine learning models that are configured to generate a prediction that represents a recommended time for capturing one or more subsequent sensor measurement of the component. The machine learning model can be trained on examples that include a sensor measurement, other feature data, and a label. The label can represent the recommended time duration before the next sensor measurement of the component is obtained.

To configure the model, the system can train the failure-prediction machine learning model using training examples that include feature values and outcomes. The outcome can indicate whether the component failed during a given time period. For example, the value "1" can indicate failure and the value "0" can indicate no failure. Feature values can include two or more images of a component, a grid map, features of the component, and features of the operating environment, as described above.

In some implementations, the first sensor measurement and the second sensor measurement can be images, and the system can further obtain a first acoustic recording of the component. For example, the acoustic recording can be taken at a location near the component so that the audio recording includes any sounds made by the component such as operating sounds. The first acoustic recording can be taken at the particular time that the first image was taken. For example, the first acoustic recording can be taken at a time before or after the particular time that the first image was taken, within a predefined window of time. For example, the first acoustic recording can be taken a few seconds, minutes, hours, or days before or after the particular time that the first image was taken. The system can further identify a second acoustic recording of the component taken at the later time that the second image was taken. For example, the second acoustic recording can be taken at a time before or after the later time that the second image was taken, within a predefined window of time. For example, the second acoustic recording can be taken a few seconds, minutes, hours, or days before or after the later time that the second image was taken. The system can process the first audio recording and each audio recording in a set of second audio recordings using a machine learning model configured to determine whether the electrical component in the first audio recording is also present in the second audio recording.

In these implementations, the system can process an input that includes at least the first image and the second image using one or more machine learning models that are configured to generate, based on one or more changes in one or more characteristics of the component as depicted in the second image compared to the first image, a prediction representative of a likelihood that the component will experience a type of failure during a time interval, wherein the time interval is a period of time after the second time, based on images. The system can process a second input that includes at least the first acoustic recording and the second acoustic recording using one or more machine learning models that is configured to generate, based on one or more changes in one or more characteristics of the component as depicted in the second acoustic recording compared to the first acoustic recording, a second prediction representative of a likelihood that the component will experience a type of failure during the time interval, based on audio recordings.

In some implementations, the first sensor measurement and the second sensor measurement can be optical images, and the system can further obtain a first thermal image of the component. The first thermal image can be taken at the particular time that the first optical image was taken. For example, the first thermal image can be taken at a time before or after the particular time that the first optical image was taken, within a predefined window of time. For example, the first thermal image can be taken a few seconds, minutes, hours, or days before or after the particular time that the first optical image was taken. The system can further identify a second thermal image of the component taken at the later time that the second optical image was taken. For example, the second thermal image can be taken at a time before or after the later time that the second optical image was taken, within a predefined window of time. For example, the second thermal image can be taken a few seconds, minutes, hours, or days before or after the later time that the second optical image was taken. The system can process the first thermal image and each thermal image in a set of second thermal images using a machine learning model configured to determine whether the electrical component in the first thermal image is also present in the second thermal image.

In these implementations, the system can process an input that includes at least the first optical image and the second optical image using one or more machine learning models that are configured to generate, based on one or more changes in one or more characteristics of the component as depicted in the second optical image compared to the first optical image, a prediction representative of a likelihood that the component will experience a type of failure during a time interval, wherein the time interval is a period of time after the second time, based on optical images. The system can process a second input that includes at least the first thermal image and the second thermal image using one or more machine learning models that is configured to generate, based on one or more changes in one or more characteristics of the component as depicted in the second thermal image compared to the first thermal image, a second prediction representative of a likelihood that the component will experience a type of failure during the time interval, based on thermal images. The second input can also include, for example, features of the operating environment such as the temperature in the environment near the component.

In these implementations, the system can determine the data indicating the prediction based on a weighted combination of the prediction and the second prediction. For example, the system can multiply the prediction and the second prediction by predefined weights, and add the weighted prediction to the weighted second prediction to determine a final prediction.

The system provides (450), for presentation by a display, data indicating the prediction. The system can provide the presentation data by transmitting the data over a network to a client device or storing the presentation data in a data store (e.g., a file system or database).

In implementations where the system obtains sensor measurements that are images and audio recordings, the system can provide data indicating the final prediction based on a weighted combination of a prediction that is based on images and a second prediction that is based on audio recordings. In implementations where the system obtains an optical image and a thermal image, the system can provide data indicating the final prediction based on a weighted combination of a prediction that is based on optical images and a second prediction that is based on thermal images.

Figure 5:
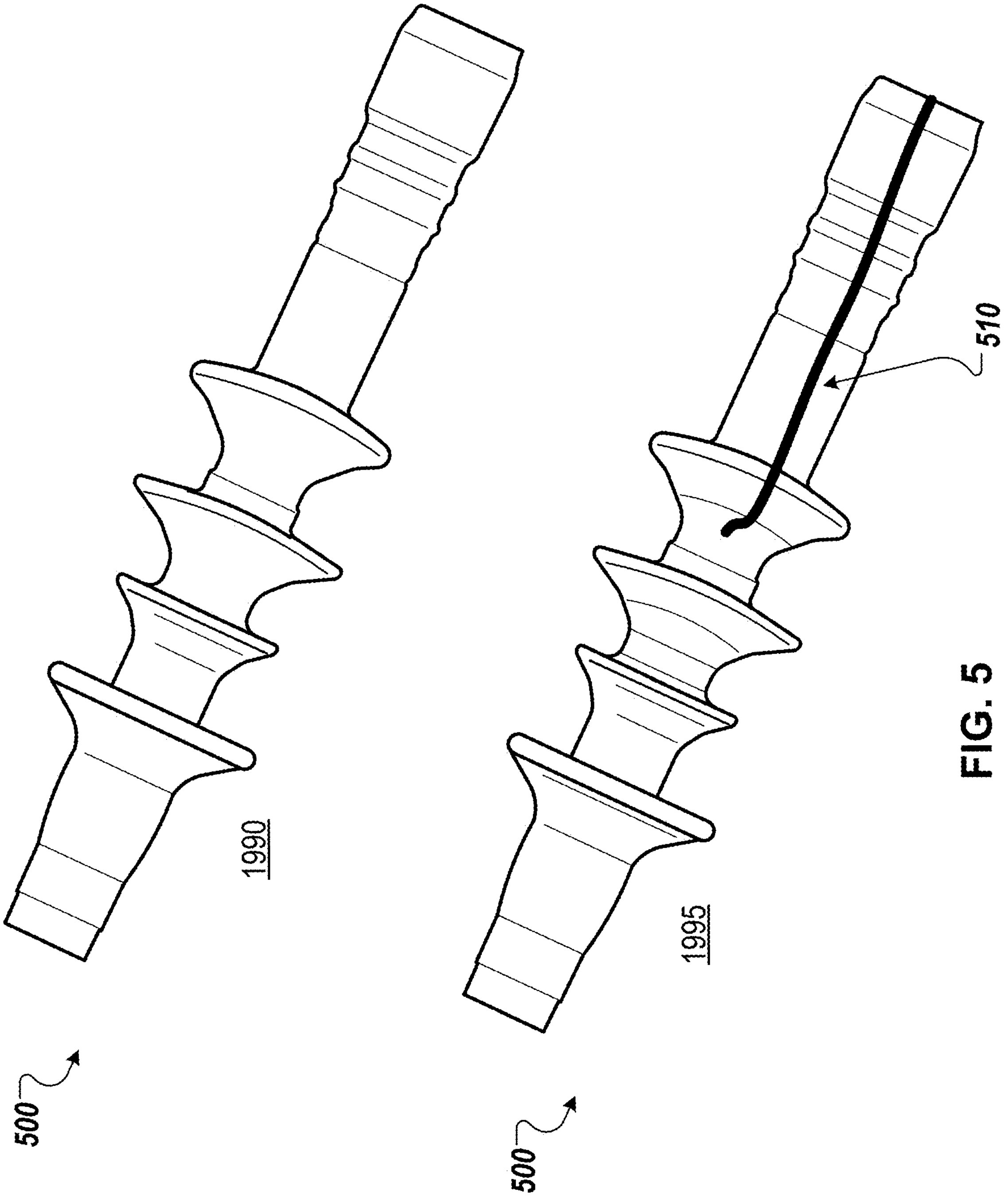
FIG. 5 is an illustration of component defects that would be detectable in thermal images over a period of time.

FIG. 5 is an illustration of component defects that would be detectable in thermal images over a period of time. FIG. 5 depicts an insulator 500 at two time periods, 1990 and 1995, and the region of different temperature or hot spot 510 increases with time. For example, in 1990, the insulator 500 does not have any hot spots. In 1995, the insulator 510 has one small hot spot 510. The hot spot 510 can be indicative of tracking, or deterioration on the surface of the insulator 500 that negatively affects the function of the insulator 500. The hot spot 510 can be detectable or present in a thermal image of the insulator 500.

Both the presence of a defect (hot spots that indicate tracking, in this example) and the rate of change of the defect can be used to predict component failure. In FIG. 5, the hot spot 510 increases over time, which can be predictive of a failure, e.g., if the component can no longer function properly, or is less-likely to function properly, if the number or area of hot spots exceeds a threshold value.

And while FIG. 5 illustrates tracking as one example, a wide variety of defects can be considered. Examples of defects detectable in thermal images can include missing or damaged insulation, operating hot spots, or thermal qualities such as the operating temperature of the component, among many others.

A system that considers the thermal history of a component, or the thermal qualities of the component at different points in time, can take advantage of predictive signals of failure or non-failure based on the thermal history. For example, a component that is exposed to a higher temperature in the environment, or that operates at a higher temperature, may wear down faster than a component exposed to or operating at a lower temperature. A component that is exposed to a higher temperature for a longer period of time may wear down faster than a component exposed to the higher temperature for a shorter period of time. A component that is exposed to a higher rate of change in temperature may wear down faster than a component exposed to a slower rate of change in temperature.

Figure 6:
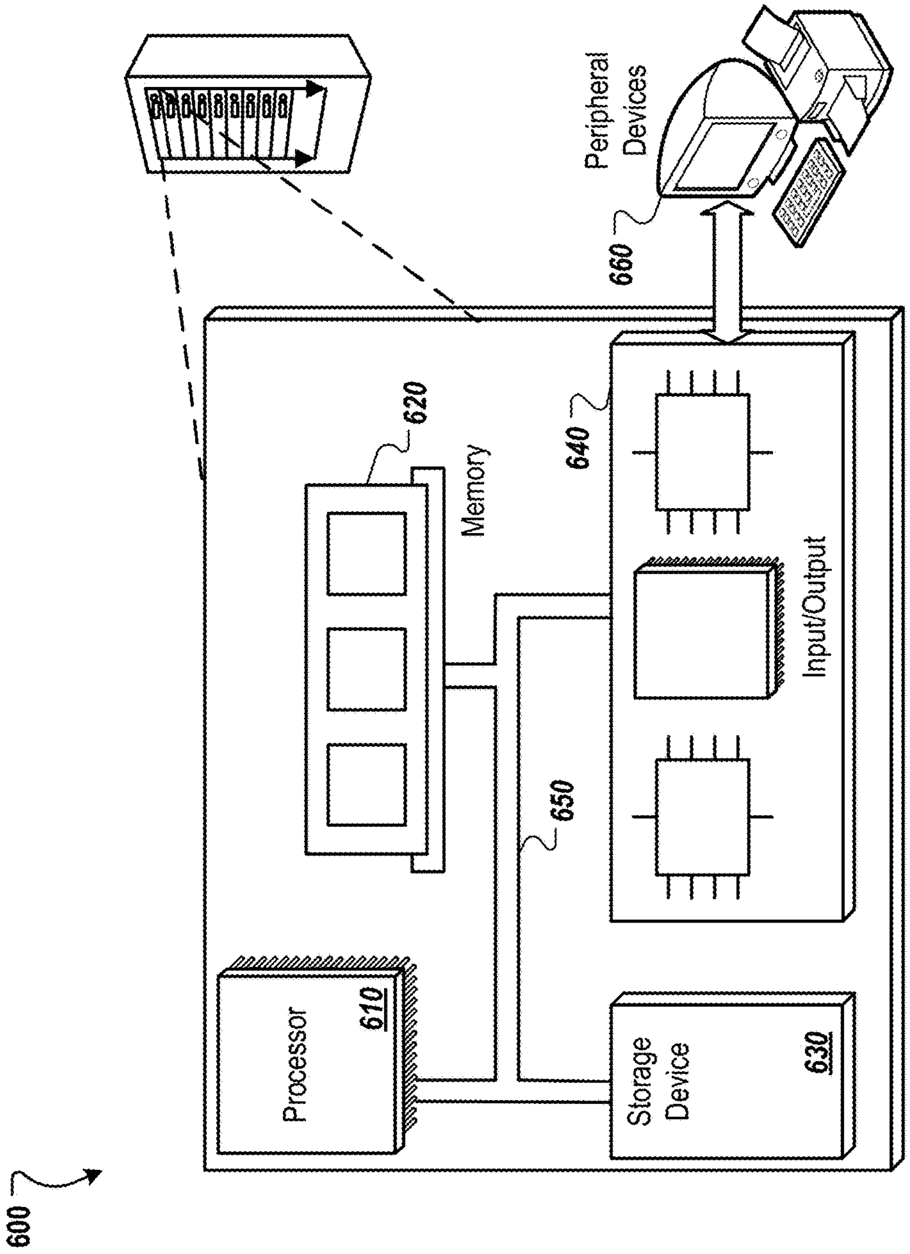
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-252 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. An electrical grid asset failure prediction method comprising:

obtaining a first image that depicts a component of an electrical grid within a portion of the first image at a first time;

identifying a set of second images that each depict the same component of the electrical grid within the images and each image represents the component of the electrical grid at a respective time after the first time;

processing, in accordance with trained values of a set of parameters of a first machine learning model, the first image and the set of images as first input to the first machine learning model that is configured to detect electrical component defects within images and to generate image encodings that indicate a presence and a type of any detected defects, the first machine learning model output including a set of image encodings indicating a particular defect in each of the first image and the second images;

processing, in accordance with trained values of a set of parameters of a second machine learning model, the set of image encodings as second input to the second machine learning model that is configured to determine a likelihood that the component of the electrical grid will fail based on a type of the particular defect and a rate of change of the particular defect as identified in each of the first image and the second images; and providing, for presentation by a display, the likelihood that the component of the electric grid will fail.

2. The electrical grid asset failure prediction method of claim 1, wherein an output of the second machine learning model includes one or more of the likelihood that the component will fail over a single period of time, the likelihood that the component will fail over each of multiple periods of time, a mean time to failure, a distribution of failure probabilities, or the most likely period over which the component will fail.

3. The electrical grid asset failure prediction method of claim 1, wherein the type of the particular defect includes one or more of bulges, tilting, loose fasteners, missing fasteners, cracks, burn marks, rust, leaking oil, missing insulation, damaged insulation, operating sounds, or thermal qualities.

4. The electrical grid asset failure prediction method of claim 1, wherein at least one of the first or the second machine learning model is a recurrent neural network.

5. The electrical grid asset failure prediction method of claim 4, wherein the recurrent neural network is a long short-term memory machine learning model or a cross-attention based transformer model.

6. The electrical grid asset failure prediction method of claim 1, wherein the first input comprises features of the component and features of an operating environment of the component.

7. The electrical grid asset failure prediction method of claim 6, wherein the features of the operating environment include a series of temperature values measured at or around a location of the component.

8. The electrical grid asset failure prediction method of claim 1, wherein first image and the second images comprise infrared images.

9. The electrical grid asset failure prediction method of claim 1, wherein the first image and the second images comprise optical images.

10. The electrical grid asset failure prediction method of claim 1, comprising:

obtaining a first acoustic recording of the component of the electrical grid recorded at a second time;

identifying a set of second acoustic recordings of the same of the component of the electrical grid each recorded prior to the first time;

processing the first acoustic recording of the component and the set of and the set of second acoustic recordings using a third machine learning model that is configured to detect electrical component defects based on audio recordings and to generate output that indicates the presence and the type of any detected defects, the second machine learning model output including data indicating a particular defect in each of the first acoustic recording and the second acoustic recordings;

processing the data indicating a particular defect in each of the first acoustic recording and the second acoustic recordings using a fourth machine learning model that is configured to determine a second likelihood that the component of the electric grid will fail based on a type of the particular defect and a rate of change of the particular defect as identified in each of the first acoustic recording and the second acoustic recordings; and determining an overall likelihood that the component of the electric grid will fail based on a weighted combination of output from the second machine learning model and output from the fourth machine learning model.

11. The electrical grid asset failure prediction method of claim 1, wherein each of the first image and the second images comprise metadata data indicating a location at which the respective image was obtained, and wherein the first machine learning model is configured to compare the metadata of the first image with metadata of the second images and determine if the second images were captured from locations within a threshold distance from a location at which the first image was captured.

12. The electrical grid asset failure prediction method of claim 11, wherein the first machine learning model is configured to determine the threshold distance based on a geographic distribution of similar electrical components within the location at which the first image was captured.

13. A system comprising one or more computers and one or more storage devices storing instructions that when executed by the one or more computers cause the one or more computers to perform operations comprising:

obtaining a first image that depicts a component of an electrical grid within a portion of the first image at a first time;

identifying a set of second images that each depict the same component of the electrical grid within the images and each image represents the component of the electrical grid at a respective time after the first time;

processing, in accordance with trained values of a set of parameters of a first machine learning model, the first image and the set of images as first input to the first machine learning model that is configured to detect electrical component defects within images and to generate image encodings that indicate a presence and a type of any detected defects, the first machine learning model output including a set of image encodings indicating a particular defect in each of the first image and the second images;

processing, in accordance with trained values of a set of parameters of a second machine learning model, the set of image encodings as second input to the second machine learning model that is configured to determine a likelihood that the component of the electrical grid will fail based on a type of the particular defect and a rate of change of the particular defect as identified in each of the first image and the second images; and providing, for presentation by a display, the likelihood that the component of the electric grid will fail.

14. One or more non-transitory computer-readable storage media storing instructions that when executed by one or more computers cause the one or more computers to perform operations comprising:

obtaining a first image that depicts a component of an electrical grid within a portion of the first image at a first time;

identifying a set of second images that each depict the same component of the electrical grid within the images and each image represents the component of the electrical grid at a respective time after the first time;

processing, in accordance with trained values of a set of parameters of a first machine learning model, the first image and the set of images as first input to the first machine learning model that is configured to detect electrical component defects within images and to generate image encodings that indicate a presence and a type of any detected defects, the first machine learning model output including a set of image encodings indicating a particular defect in each of the first image and the second images;

processing, in accordance with trained values of a set of parameters of a second machine learning model, the set of image encodings as second input to the second machine learning model that is configured to determine a likelihood that the component of the electrical grid will fail based on a type of the particular defect and a rate of change of the particular defect as identified in each of the first image and the second images; and providing, for presentation by a display, the likelihood that the component of the electric grid will fail.

* * * * *